United States Patent

[11] 3,586,030

[72] Inventor Lars-Gunnar Nordin
 1, Samaritgrand, Stockholm, Sweden
[21] Appl. No. 741,185
[22] Filed June 28, 1968
[45] Patented June 22, 1971

[54] VALVE SYSTEM
 3 Claims, 1 Drawing Fig.
[52] U.S. Cl. .................................................. 137/109,
 137/118, 137/111
[51] Int. Cl. ................................................ G05d 16/10
[50] Field of Search .......................................... 137/109,
 99, 111, 118, 100, 115, 101, 91-422; 91/419, 401

[56] References Cited
 UNITED STATES PATENTS
2,717,652 9/1955 Nichols ........................ 91/401
2,437,113 3/1948 Montelius..................... 137/99
3,437,103 4/1969 Yoshino ....................... 137/100

Primary Examiner—William F. O'Dea
Assistant Examiner—William H. Wright
Attorney—Pierce, Scheffler and Parker ABSTRACT: A valve system disposed between two pressure systems employing the same pressure medium, which includes valves responsive to a decrease in pressure in either pressure system to enable pressure to be restored therein, valves responsive to excessive pressure in either of said pressure systems to relieve said excess pressure and means cooperating with additional valves when there is excessive pressure in both pressure systems to balance the pressures therein.

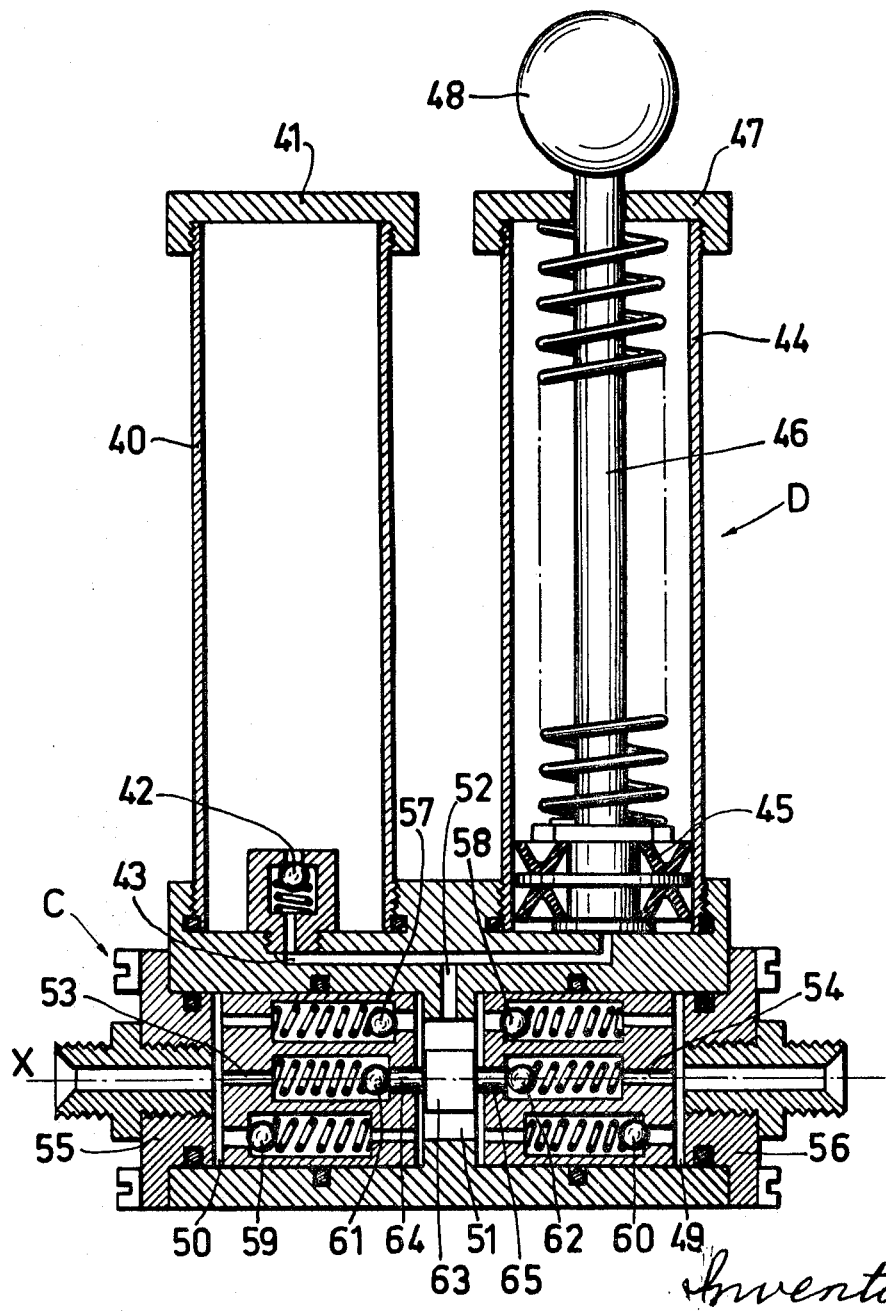

VALVE SYSTEM

This invention relates to a valve system intended to be placed between two sides of a pressure system filled with a pressure medium, which system may comprise, for example, double or double-acting transmitting and receiving means and is provided with a valve group for each side of the pressure system, including a low-pressure valve and a high-pressure valve.

The valve system according to the invention can be connected, for example, in a hydraulic control system for the transfer of movements of a steering wheel or the like to wheels, rudders or the like.

The invention has as its main object to produce a valve system, which allows both sides of a hydraulic system or the like at control movements to operate separately and protected against overpressure, which valve system however, at the same time allows for the balancing of pressure differences in the system caused by expansion in the pressure medium, for example at nonuniformly distributed temperature changes in the ducts of the system.

These objects are achieved in that the valve system is given the characterizing features defined in the claims.

An embodiment of the invention is described in the following, with reference to the accompanying drawing. The FIGURE shows a section through the valve system and a pressure medium source.

Between two sides in a pressure system, for example a hydraulic control system, is mounted a valve housing C to which also a source D for the pressure medium of the system is connected. With this source is associated a storage container 40, which at its lower end is mounted in the valve housing and upwardly is closed by a cover 41. A stop valve 42, preferably a spring-loaded ball valve, is mounted in the container and allows pressure medium to be sucked out of the container, but not to be returned thereto. In the valve housing, from the valve 42 of the oil container a passage 43 is drilled to a pump cylinder 44 mounted in the valve housing and provided with a spring-loaded pump piston 45, the rod 46 of which projects out through the cover 47 of the cylinder 44 and can be actuated from the outside, for example manually by a control button 48. Into the valve housing further are drilled two valve chambers 49, 50 having a common axis X from both ends of the valve housing and being connected by an intermediate connection chamber 51, to which also a duct 52 from the oil supply passage 43 is connected. In each of the valve chambers are disposed a valve body 53 and 54, respectively, which are sealed relative to the chamber walls, for example, by an O-ring. The valve chambers outwardly are closed by a cover 55 and 56, respectively, disposed in spaced relationship to the bodies 53, 54 so that the bodies have a limited movability in the chamber. In the covers 55, 56 connections are placed, by which the valve housing is connected with both sides of the system and which open into the respective valve chamber. Each of the valve bodies 53, 54 comprises a low-pressure valve 57 and 58, respectively, a high-pressure valve 59 and 60, respectively, and a balancing valve 61 and 62, respectively. In the embodiment shown the valves are spring-loaded stop valves of the ball type, disposed in borings in the valve bodies extending in the same direction as the common axis X of the valve chambers. The borings of the balancing valves preferably are made along said axis X. In the connection chamber 51, along the same axis as that of the borings of the balancing valves 61, 62, a die 63 is placed and provided with pins 64, 65, which project into the respective boring and have such dimensions, that they just lift the balls of the balancing valves 61, 62 from their seats when both of the valve bodies 53, 54 abut the inner end surfaces of the valve chambers 49 and 50.

The valve system described operates as follows.

When the pressure system is being charged, the spring-loaded piston 45 in the pump cylinder 44 is drawn up manually by help of the button 48. Thereby pressure medium is sucked out from the storage container 40 through the valve 42 and passage 43 into the pump cylinder 44. When thereafter the button 48 is released, the pressure medium in the cylinder 44 is pressed out through the low-pressure valves 57, 58 to both sides of the pressure system and fills the same, by means of the spring force acting upon the piston 45 and because the passage to the storage container 40 is closed by the valve 42. In the system there are further provided in known manner venting screws (not shown) through which air may be removed. During operation periods both sides of the system now operate as closed systems protected against overpressure. In the event of overpressure, the high-pressure relief valve 59 or 60 on that side of the system where overpressure prevails opens, and the pressure medium can flow back through the same.

An expansion of the pressure medium which, for example, may be caused by a heating of the ducts on one side of the system, is indicated by a pressure increase on both sides of the system until equal and so actuates the two valve bodies 53 and 54 that they are moved towards each other in the respective valve chamber 49, 50 against their inner end surfaces. This movement, which only needs to amount to some tenths of one millimeter, causes the pins 64, 65 of the valve die 63 to lift the two valve balls 61, 62 from their seats whereafter the pressure falls to the value set. This actuation of the balancing valves, thus, takes place only at a pressure increase, which is equal on both valve bodies 53, 54.

As already mentioned, the embodiment shown and described is merely one example of the realization of the invention, and changes can be made without abandoning the object of the invention. The valve system need not necessarily have the design shown. Instead of the construction shown, the valve groups can be imagined to be arranged in separate housings and to have another means for actuating the balancing valves. The pressure medium source may be placed separately, and also it may be given a design different of that shown.

What I claim is:

1. A valve system interconnecting the two sides of a double-acting pressure fluid control system having means responsive to a pressure medium including means responsive to low pressure in the system for admitting additional pressure medium to reestablish operating pressure in said control system and valves responsive to excess pressure on one side of said control system to relieve said excess pressure therein, the improvement comprising two balancing valves arranged coaxially between the two sides of the control system for reestablishing operating pressure when the pressure on both sides of the control system exceeds a predetermined critical high valve and means for opening said balancing valves including two coaxially arranged body means movable toward each other in response to the critical high pressure on both sides of the control system, and means operable by said body means for actuating each of said two balancing valves for relieving said high pressure when said two body means have been moved toward each other by the critical high pressure.

2. A valve system as claimed in claim 1 and further comprising two coaxial chambers, the outer ends of which are in communication with the respective sides of the control systems and in which said two body means are slidably mounted, a connecting chamber between said coaxial chambers, means between said two body means mounted in said connecting chamber, said means in the connecting chamber being actuated when said body means move toward each other to open said two balancing valves, and a container in communication with the connecting chamber for receiving the pressure released when said balancing valves are opened.

3. A valve system as claimed in claim 2 wherein each of said balancing valves comprise spring loaded sealing members disposed within said body means and wherein said means within the connecting chamber include means for opening said spring loaded sealing members within said body means when said body means have been moved toward each other by the critical high pressure.